US008256995B2

(12) United States Patent
McMahon

(10) Patent No.: US 8,256,995 B2
(45) Date of Patent: Sep. 4, 2012

(54) ABOVEGROUND MODULAR, PERMEABLE REACTIVE BARRIER SYSTEM FOR LIQUID RUNOFF TREATMENT

(76) Inventor: James P. McMahon, San Antonio, TX (US)

(*) Notice: Subject to any disclaimer, the term of this patent is extended or adjusted under 35 U.S.C. 154(b) by 1116 days.

(21) Appl. No.: 11/440,937

(22) Filed: May 25, 2006

(65) Prior Publication Data
US 2006/0263151 A1 Nov. 23, 2006

Related U.S. Application Data

(63) Continuation-in-part of application No. 10/914,874, filed on Aug. 10, 2004, now abandoned.

(51) Int. Cl.
*B01D 39/00* (2006.01)
*E02B 3/12* (2006.01)
(52) U.S. Cl. .......... 405/302.7; 405/302.6; 405/114; 405/16; 405/17; 210/170.03; 210/747.3
(58) Field of Classification Search .......... 405/302.7, 405/302.6, 302.4, 258.1, 114, 115, 15, 16, 405/17, 18, 50, 45; 210/170.03, 170.1, 747, 210/747.1, 747.2, 747.3
See application file for complete search history.

(56) References Cited

U.S. PATENT DOCUMENTS

| | | | | |
|---|---|---|---|---|
| 3,723,308 A * | 3/1973 | Breck | ............................ | 210/681 |
| 4,666,610 A * | 5/1987 | Kuhns | ............................ | 210/749 |
| 4,695,387 A * | 9/1987 | Berry et al. | .................... | 210/676 |
| 4,756,511 A * | 7/1988 | Wright, III | .................... | 256/12.5 |
| 5,057,227 A * | 10/1991 | Cohen | ............................ | 210/680 |
| 5,100,258 A * | 3/1992 | VanWagoner | .................. | 405/45 |
| 5,294,337 A * | 3/1994 | Johnson | ........................ | 210/266 |
| 5,322,629 A * | 6/1994 | Stewart | ........................ | 210/767 |
| 5,519,985 A * | 5/1996 | Dyck et al. | ..................... | 53/527 |
| 5,531,063 A * | 7/1996 | Sawhney et al. | .................. | 57/12 |
| 5,573,349 A * | 11/1996 | Paoluccio | ...................... | 405/52 |
| 5,584,599 A * | 12/1996 | Knittel | ............................ | 405/15 |
| 5,595,458 A * | 1/1997 | Grabhorn | .................. | 405/302.6 |
| 5,605,416 A * | 2/1997 | Roach | ............................ | 405/21 |
| 5,713,696 A * | 2/1998 | Horvath et al. | ................. | 405/45 |
| 6,080,314 A * | 6/2000 | Rose | ............................. | 210/631 |
| 6,109,835 A * | 8/2000 | Grabhorn | .................. | 405/302.6 |
| 6,422,787 B1 * | 7/2002 | Mikell | ............................ | 405/15 |
| 6,428,695 B1 * | 8/2002 | Naftz et al. | ............. | 210/170.07 |
| 6,527,477 B1 * | 3/2003 | Allard | ............................. | 405/45 |
| 6,531,063 B1 * | 3/2003 | Rose | ............................. | 210/631 |
| 6,709,202 B2 * | 3/2004 | Spangler et al. | ........... | 405/302.6 |
| 6,733,209 B2 * | 5/2004 | Allard | ............................ | 405/302.6 |
| 6,814,871 B1 * | 11/2004 | Bem et al. | ...................... | 210/660 |
| 6,824,690 B1 * | 11/2004 | Zhao et al. | ..................... | 210/682 |
| 6,857,818 B2 * | 2/2005 | Bussey et al. | ................... | 405/38 |
| 6,905,289 B1 * | 6/2005 | Sanguinetti | ................ | 405/302.6 |
| 7,303,084 B2 * | 12/2007 | McPhillips | .................. | 210/501 |
| 7,422,682 B2 * | 9/2008 | McPhillips | .............. | 210/170.03 |
| 2003/0031511 A1 * | 2/2003 | Tyler | ............................. | 405/15 |
| 2005/0161407 A1 * | 7/2005 | McPhillips | ................... | 210/747 |

* cited by examiner

*Primary Examiner* — Frederick L Lagman
(74) *Attorney, Agent, or Firm* — Akin Gump Strauss Hauer & Feld, LLP

(57) ABSTRACT

A system and method are disclosed for the treatment of liquid runoff, such as rainfall, irrigation, and waste or produced water, utilizing aboveground, modular, permeable barriers containing reactive media that can immobilize particular solutes of concern, removing them from the liquid runoff. The modular design allows construction of a relatively-uniform barrier, or media volume, that is self-supporting and easily assembled, maintained, modified, and augmented. A permeable reactive barrier constructed according to the present invention provides significant contact between the reactive media and the solutes of concern while allowing the runoff stream to flow through the structure relatively unimpeded.

16 Claims, 4 Drawing Sheets

ABOVEGROUND MODULAR, PERMEABLE REACTIVE BARRIER SYSTEM FOR LIQUID RUNOFF TREATMENT

CROSS-REFERENCE TO RELATED APPLICATIONS

This application is a continuation-in-part of U.S. application Ser. No. 10/914,874, filed Aug. 10, 2004, now abandoned, which is incorporated by reference herein for all purposes.

FIELD OF THE INVENTION

The present invention relates generally to the field of pollution abatement. More particularly, it concerns a method and system for treating liquid runoff, such as rainfall, irrigation, and waste or produced water, to prevent the transportation of solutes.

BACKGROUND OF THE INVENTION

Undesirable solutes in liquid runoff can originate from a variety of sources, including atmospheric deposition and mobilization of substances occurring on or near a ground surface. Methods to reduce the amount of unwanted solutes in runoff streams include the construction of catchment basins wherein the runoff stream accumulates until it either evaporates or permeates into the ground; grass filter strips wherein the runoff stream's velocity is reduced allowing infiltration; drainage systems incorporating buried permeable reactive barriers wherein runoff drainage is directed through a subsurface packed media bed that immobilizes the solutes as the drainage passes through; and aboveground permeable reactive barriers comprising large three dimensional structures the size of the area to be treated constructed on drainage-way sites and filled with reactive media.

These present methods are limited in application because they either fail to adequately treat the liquid runoff or they have installation and maintenance requirements that are not suitable for many settings. Catchment basins require a large space that may not be available, particularly at established facilities. Grass filter strips may also require a large space and may be less effective on steep slopes or during high rainfall events. Buried permeable reactive barriers are difficult to access when maintenance is required and may require an additional drainage system to direct liquid runoff to and from the barrier, which increases the cost and complexity of installation. Aboveground permeable reactive barriers constructed by filling a large structure with loose reactive media require special skills and bulk material handling equipment to construct and may be difficult to maintain, partially replace, or augment. Also, it is very difficult to use existing methods to construct a barrier designed to remove several different solutes from liquid runoff by using multiple media types that must be kept separate.

Another method that could conceivably be used to reduce the amount of undesirable solutes in liquid runoff is discussed in U.S. patent application Ser. No. 10/208,631 (Tyler). Tyler discloses tubular devices that control erosion by inhibiting the flow of water and lowering its velocity in order to allow solids to fall out of suspension. Tyler discloses filling the tubular erosion control devices with permeable reactive media to treat liquid runoff and separately discloses stacking the devices to form a retaining wall to control erosion. There are numerous reasons, however, why a barrier constructed from a stack of the tubular erosion control devices in Tyler would be ill-suited for treatment of liquid runoff.

First, a barrier constructed out of stacked tubes would necessarily have a pyramid shape and, therefore, a sloped face. Liquid runoff takes the path of least resistance and would tend to flow over the top of the pyramid-shaped barrier rather than through the tubes at the base of the structure. This would result in a significant amount of unfiltered runoff. This also means that the tubes at the base and in the middle of the pyramid do not actually filter a significant amount of liquid runoff whereas the tubes on the outside of the pyramid encounter more runoff than they can adequately filter. This imbalance results in high maintenance costs for the outer tubes, low efficiency and waste from the unused media in the inner tubes, and untreated runoff.

Second, accessing individual tubes in a barrier constructed according to Tyler in order to change or clean the reactive media in the tubes or to otherwise service the tubular devices would be costly and time consuming. Because most of the tubes in a pyramid-shaped barrier rely on other tubes for support, it would be necessary to destroy the entire barrier when even one tube near the base of the structure needed to removed for maintenance or modification.

Third, a barrier constructed out of tubes would have significant inter-container voids because tubes lack sides that can mate snugly with adjacent tubes. These voids would reduce the amount of contact between the reactive media in the tubes and the undesired solutes in the runoff, resulting in further untreated liquid runoff.

Finally, tubular erosion devices tend to roll when placed in the path of rapidly-flowing runoff. This can result in an unstable barrier that requires extensive maintenance and an elaborate and costly system for securing the tubes in the barrier to each other and securing the entire structure to the ground.

What is needed is a system for treatment of liquid runoff that uses reactive media to immobilize solutes of concern, that is easily assembled, maintained, modified, and augmented, and that has a geometry that enhances contact between the reactive media and the solutes.

BRIEF SUMMARY OF THE INVENTION

Accordingly, the present invention provides a system and method for the treatment of liquid runoff comprising modularized, self-supporting, aboveground permeable reactive barriers, or media volumes. In certain embodiments, the individual modules, or containers, that form the barriers may have substantially planar or flat sides so that the sides of the modules may fit together snugly with the sides of adjacent modules to form a substantially uniform barrier with no substantial inter-module voids. The modules may be filled with a reactive media chosen to immobilize a particular solute so that, when assembled together, they form a barrier that is essentially a large volume of media.

In addition to facilitating the construction of a relatively uniform barrier that is free of inter-module voids, the shape of the individual media modules provides further advantages over previous methods. For example, when certain embodiments of modules with substantially planar sides are assembled together, they may create a barrier with generally planar exterior surfaces that can be oriented simultaneously both orthogonal to the flow of the runoff stream to provide uniform flow into the reactive media—through the flat-front face of the modules—and parallel to the runoff stream flow to reduce turbulence in situations where the runoff flows across the exterior surfaces of the barrier. This means that, in these embodiments, substantially all of the portion of liquid runoff stream that comes in contact with the front of the present barrier will flow through it. Modules with planar sides may also allow for the construction of an inherently stable barrier because they do not tend to roll, even in forceful runoff streams.

The modularity of the present invention provides further advantages. For example, using modules may facilitate construction of a permeable reactive barrier suitable for a variety of drainage-way sites with a wide range of solute species, hydrological parameters, and land forms. Also, modules constructed according to the present invention may have the advantage of being relatively easy to access for maintenance, modification, or augmentation. In certain embodiments, access to an individual module within the barrier can be had simply by moving the few modules that might be on top of it. The rest of the media volume may remain undisturbed in the process. This ability to access individual modules is found in certain embodiments where the modules have relatively planar sides that allow for construction of a self-supporting and stable structure that may retain its shape over time.

Further advantages derive from the flexibility in the design and application of aboveground permeable reactive barriers constructed according to the present invention. For example a barrier may be designed for a particular drainage-way site to first treat a "first flush" of liquid runoff and then allow much of the following runoff in a rising runoff stream to pass over the media volume without damaging it or the occupied drainage-way site. Additionally, in certain embodiments, modules with differing media compositions may be placed in different sections of an otherwise uniform larger reactive barrier to treat liquid runoff streams with multiple solute species of concern. This may be particularly helpful in situations where two types of reactive media must be kept separate.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. The same reference numerals are employed to designate like parts in all Figures.

DETAILED DESCRIPTION OF PREFERRED EMBODIMENTS

Figure 1:
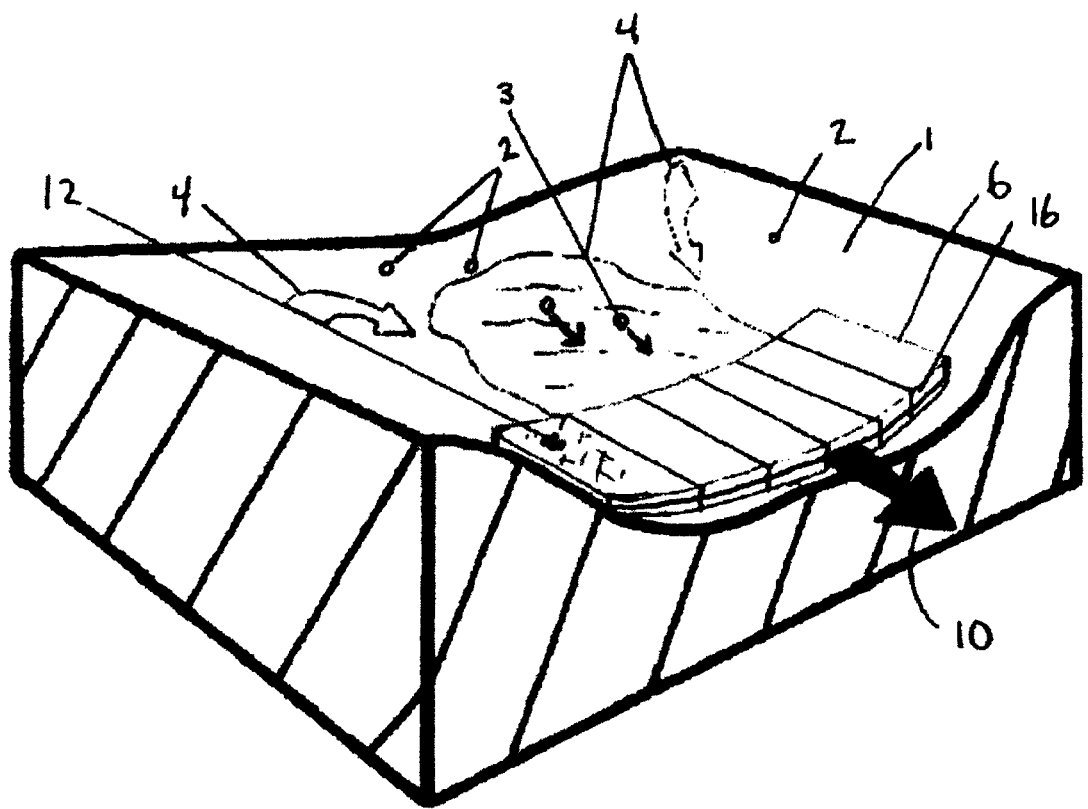
FIG. 1 depicts an embodiment of the invention wherein a plot of land is shown containing a substance being first mobilized by liquid (rainfall) runoff and subsequently captured as the runoff stream passes through the aboveground permeable reactive barrier, or media volume, relatively unimpeded.

FIG. 1 shows one embodiment of the present invention. The figure depicts a plot of agricultural land 1 containing a substance 2 on the surface and an aboveground permeable reactive barrier structure 6 comprised of individual modules or containers 16 constructed according to the system and method taught in the present invention. Accumulated rainfall mobilizes some of the substance 2 in rainfall runoff 4 whereby substance 2 becomes solute 3. The rainfall runoff 4 flows along the existing drainage ways to the reactive barrier 6. The rainfall runoff 4 containing the solute 3 flows substantially unimpeded through the barrier 6 wherein reactive media 12 contained within the modules 16 takes up the unwanted solute 3. Treated rainfall runoff 10 exits the permeable barrier structure with a substantially reduced solute concentration.

The reactive media 12 preferably has a surface that reacts with or takes up and holds solutes, and may include zeolites, ion-exchange materials, activated carbon and other organic substances, biological matter, calcium carbonate, or iron filings for example. As used herein, the term "zeolite" means a three dimensional, microporous, crystalline solid that includes aluminum, silicon and oxygen in a regular framework. Natural zeolite material exists that may be mined and crushed into various size pieces. One preferred size of the zeolite pieces is greater than three-eighths of an inch and less than three quarters of an inch in diameter. In one embodiment of the present invention, the natural zeolite species clinoptilolite is utilized because of a high selectivity for ammonium, a common substance found in rainfall runoff from agricultural land.

After prolonged use, the clinoptilolite media can be maintained within the individual media modules, for example, by washing out accumulated silt, removing accumulated ammonium by washing with an eluant, or bio regenerating with bacteria or algae. In most settings bio regeneration will commence naturally with the native flora present, or additionally the process can be accelerated by inoculating the barrier with a concentrated source of bacteria such as compost tea.

The modules 16 can be combined to form aboveground permeable reactive barrier structures of various shapes, sizes, and compositions, as required for removing unwanted solutes from runoff streams in a variety of settings. Important considerations for aboveground permeable reactive barriers are proper media selection and a barrier geometry that includes sufficient width, or length of travel through the media 12 for the runoff stream to afford increased contact opportunities between the media and the solutes of concern. It is preferred that the permeable reactive barrier is constructed in such a manner that the transportation of solutes in rainwater drainage is inhibited but the flow of rainwater along the drainage pathway is not inhibited or impeded. A person having ordinary skill in the art will be able to construct a barrier to address the particular requirements of a wide variety of settings.

Figure 2:
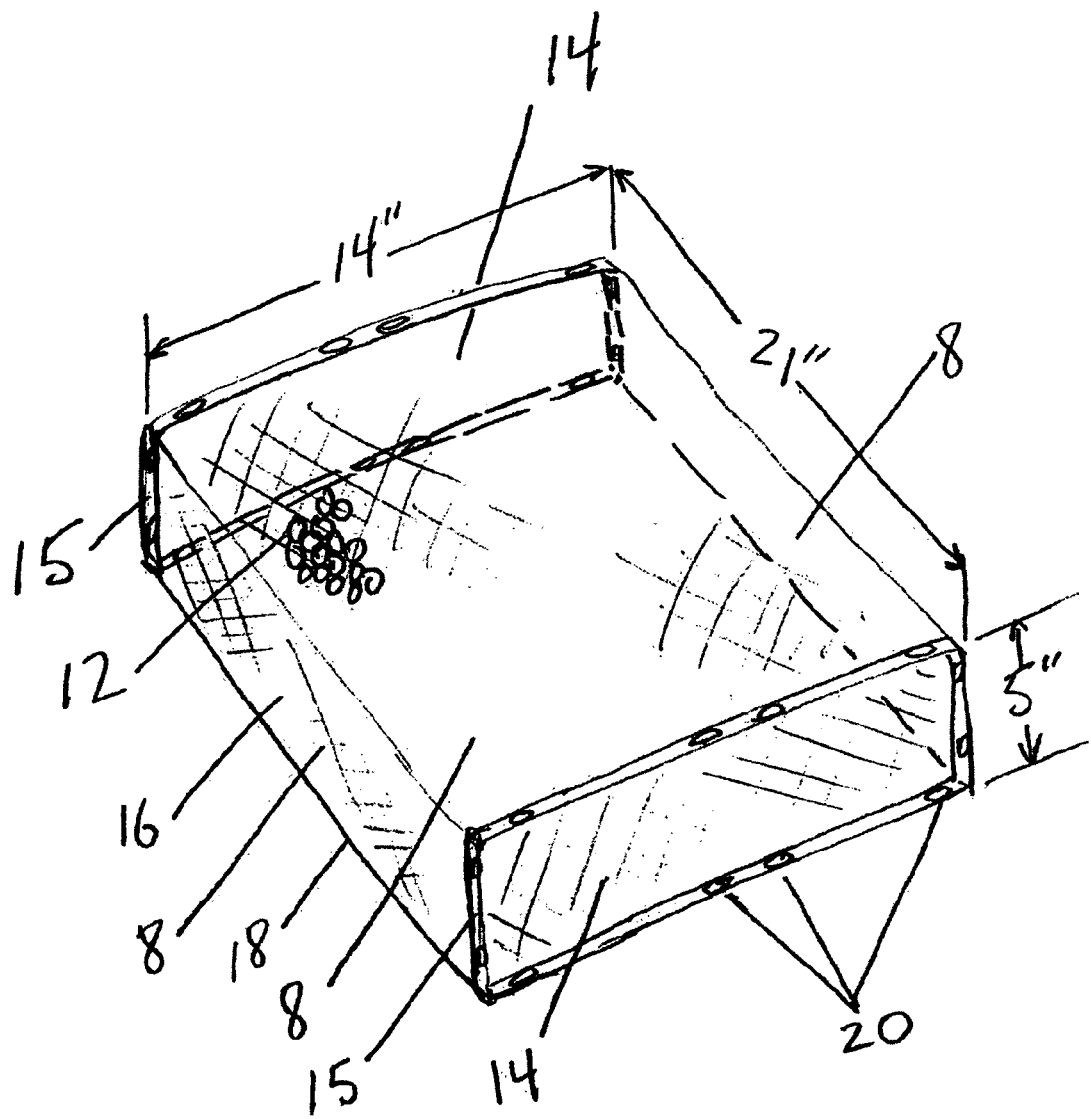
FIG. 2 depicts an embodiment of the invention wherein a hexahedron-shaped module with three sets of parallel sides is shown that is constructed of pliable netting with reinforced edges on two opposing sides to facilitate shape retention, anchorage, and assembly with other containers.

FIG. 2 shows one embodiment of an individual module or container 16. In this embodiment the module 16 is hexahedron-shaped with three sets of substantially parallel sides 8 and is comprised of netting 18 with two reinforced shape-retaining ends 14 and reactive media 12. The module 16 is shaped so that, when joined together with other modules, the substantially flat adjacent sides 8 match and mate tightly together, eliminating any substantial gaps, holes, or voids that might otherwise be formed where adjacent module sides intersect in an assembled permeable barrier structure 6. In one embodiment, the netting 18 is formed with material that resists photo-degradation, has apertures small enough to contain the reactive media 12, sufficient mechanical strength to resist rupture during transportation, installation, and maintenance, and is sufficiently pliable to conform to the shape of the ground surface. Reinforced ends 14 may be comprised of a material with suitable strength to securely close netting 18, retain the shape of the module 16, accommodate optional anchorage and attachment holes 20, and can be either sewn or welded onto the netting, or, in cases where the netting is comprised of thermoplastic, formed with excess netting material at the edges of the joined sides 8 and 14 using heat and pressure.

In one embodiment, modules 16 are 5 inches tall, 14 inches wide, and 21 inches long, hold approximately 45 pounds of clinoptilolite or other reactive media 12 sized between three-eighths and three-quarters of an inch in diameter, and utilize UV stabilized extruded high density polyethylene plastic netting 18 with 0.25 inch apertures. In this embodiment, excess netting 18 at the junction of sides 8 and reinforced ends 14 is formed with heat and pressure into 0.625 inch wide reinforcements 15 that accommodate punched 0.375 inch diameter anchorage and attachment holes 20 centered and spaced 1 inch from each of the four corners in reinforced ends 14 with additional holes centered and spaced 6 inches from the corner of each long side of said reinforced ends 14. An advantage of this embodiment is that the individual modules can be handled manually by a single person for installation and maintenance, without the use of machinery.

Preferably, the sides 8 of the modules 16 are constructed with similar materials and are seamless with no reinforced edges (the module deriving its shape and support from the reinforced ends 14 and the reactive media 12). This design allows the sides 8 of the modules 16 to be constructed without obstructions that would impair the otherwise substantially uniform hydraulic conductivity through the reactive media volume.

Figure 3:
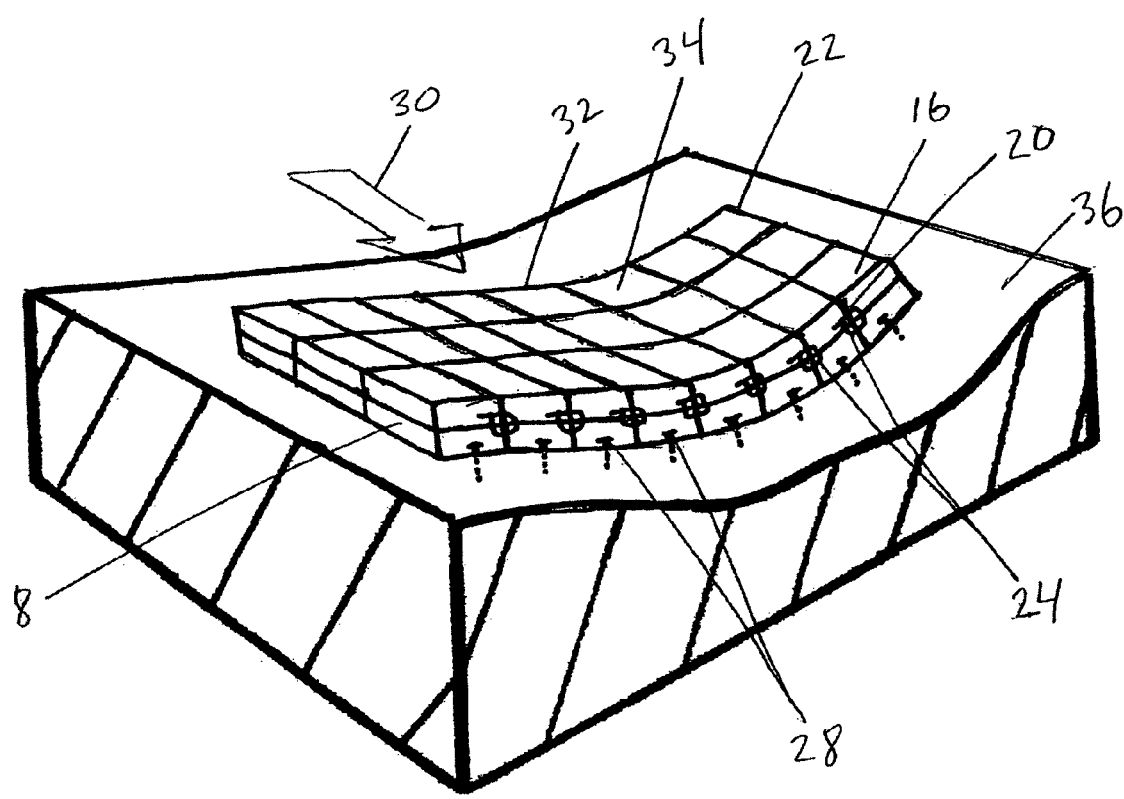
FIG. 3 depicts an embodiment of the invention wherein multiple media containers are shown anchored to the ground surface and assembled together into a larger uniform volume of media comprising a modularized aboveground permeable reactive barrier structure with substantially planar exterior surfaces.

FIG. 3 shows another embodiment of the present invention. In this figure, the aboveground permeable reactive barrier structure 22 is comprised of individual media modules 16 attached together with attachment straps 24 through anchorage and attachment holes 20 and anchored to the ground surface with anchorage stakes 28 inserted through anchorage and attachment holes 20 and driven into the ground surface 36. In one embodiment, attachment straps 24 are UV stabilized high density polyethylene cable ties 8 inches long with 50 lb breaking strength, anchorage stakes 28 are galvanized steel spikes 10 inches long and 0.25 inches in diameter. Sets of the substantially parallel sides 8 and 14 of assembled modules 16 create planar surfaces on the structure 22 simultaneously both perpendicular and parallel to the liquid runoff stream flow 30 so as to promote uniform flow into the media volume through the upstream exterior surface 32 and facilitate substantially laminar exterior flow across top surface 34 when runoff steams rise above the height of upstream exterior surface 32.

The embodiment shown in FIG. 3 may be assembled by first placing media modules 16 side by side in a drainage-way, attaching them together and to the ground surface, to form a first media module row orthogonal to the direction of liquid runoff flow that is of sufficient length to accommodate the width of the runoff stream to be treated. Additional rows may then be added to the downstream side of the first row until a first media layer, one module high, is formed with sufficient contacting width to provide immobilization of a solute of concern in the runoff stream as it would flow through the first media layer. Other media layers similar to the first media layer are added and attached to the first layer creating a media volume, or barrier, with sufficient height to accommodate the depth of the runoff stream to be treated.

Figure 4:
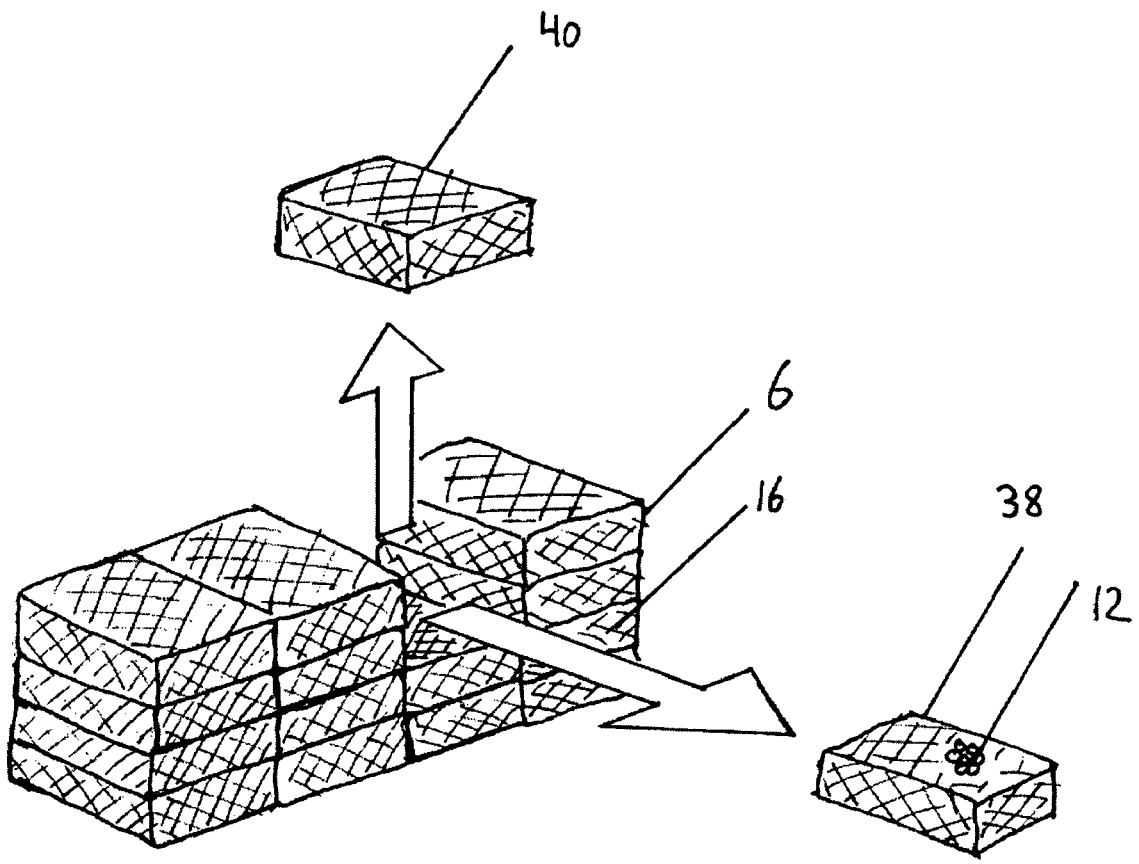
FIG. 4 depicts an embodiment of the invention wherein a process is shown for removing an individual module from the reactive barrier without the need to disassemble the entire media volume.

FIG. 4 shows another embodiment of the present invention. Specifically, this figure depicts a modular barrier 6 constructed to permit easy removal of a module to be serviced 38 without the need to disassemble the entire barrier 6. This can be accomplished by locating the module to be serviced 38 within the barrier and removing any modules above it 40 that may be blocking access. Once the module to be serviced 38 is exposed, it can easily be removed from the barrier 6 for repair, modification, or cleaning of the module 38 itself or the reactive media 12 within the module. For example, the reactive media 12 within the module to be serviced 38 may be completely replaced with the same type of media, or a different type of media if the requirements of the barrier 6 change, or it may be cleaned periodically to maintain its ability to treat the runoff. The remaining modules 16 and the barrier 6 remain relatively undisturbed throughout this process.

A further embodiment of the present invention utilizes a characteristic of sand bags in that the shape of the modules conform to the ground surface and other adjacent bags forming a structure that does not require anchorage or attachment of the individual containers to each other.

The foregoing description of the preferred embodiments of the present invention has been presented for purposes of illustration. It is not intended to be exhaustive or to limit the invention to the precise forms disclosed. Many variations and modifications of the embodiments described herein will be apparent to one of ordinary skill in the art in light of the above description. The scope of the invention is to be defined only by the claims appended hereto.

What is claimed is:

1. A modular liquid-runoff treatment system for placement in the flow path of a liquid runoff stream comprising a substantially water-permeable barrier having generally planar exterior surfaces, said barrier comprising a plurality of modules each of which is adapted to fit relatively snugly with adjacent modules whereby the barrier has no substantial inter-module voids and said modules being filled with a quantity of reactive media capable of reducing the amount of particular solutes in the liquid runoff by contact while allowing the relatively unimpeded flow of the liquid runoff stream through said barrier and wherein said barrier contains at least two types of reactive media compositions, each said type of reactive media composition being contained in a separate module.

2. A system according to claim 1 wherein said modules further comprise an outer netting material.

3. A system according to claim 2 wherein said netting material has apertures small enough to contain said media.

4. A system according to claim 2 wherein said netting material comprises polyethylene extruded plastic.

5. A system according to claim 2 wherein said netting material comprises UV stabilized high-density polyethylene extruded plastic.

6. A system according to claim 2 wherein said modules are substantially hexahedron-shaped with three sets of relatively parallel sides and the shape of said modules is achieved and maintained primarily by reinforced edges on one said set of parallel sides.

7. A system according to claim 6 wherein said reinforced edges are formed by attaching reinforcing material to said set of parallel sides.

8. A system according to claim 6 wherein said reinforced edges are formed by applying heat and pressure to excess netting material on the edges of said module.

9. A method for treating liquid runoff comprising:
(a) filling a plurality of individually replaceable modules with reactive media capable of immobilizing particular solutes, said filled modules being substantially water permeable and being adapted to fit snugly with adjacent modules;
(b) placing a layer of said filled modules in the path of liquid runoff to form a substantially uniform barrier with generally planar exterior surfaces and few inter-module voids, said barrier being of sufficient width and length to provide desired contact between the reactive media and the solutes;
(c) placing additional layers of said filled modules on top of the first layer to form a barrier of sufficient height to treat the desired depth of liquid runoff; and
(d) wherein said barrier contains at least two types of reactive media compositions, each said type of reactive media composition being contained in a separate module.

10. A method according to claim 9 wherein said modules further comprise an outer netting material.

11. A method according to claim 10 wherein said netting material has apertures small enough to contain said media.

12. A method according to claim 10 wherein said netting material comprises polyethylene extruded plastic.

13. A method according to claim 10 wherein said netting material comprises UV stabilized high-density polyethylene extruded plastic.

14. A method according to claim 10 wherein said modules are substantially hexahedron-shaped with three sets of relatively parallel sides and the shape of said modules is achieved and maintained primarily by reinforced edges on one said set of parallel sides.

15. A method according to claim 14 wherein said reinforced edges are formed by attaching reinforcing material to said set of parallel sides.

16. A method according to claim 14 wherein said reinforced edges are formed by applying heat and pressure to excess netting material on the edges of said module.

* * * * *